June 18, 1946.  C. A. SIVER  2,402,187
FLUID SUPPLY APPARATUS AND CONTROL SYSTEMS THEREFOR
Filed Dec. 31, 1940  2 Sheets-Sheet 2

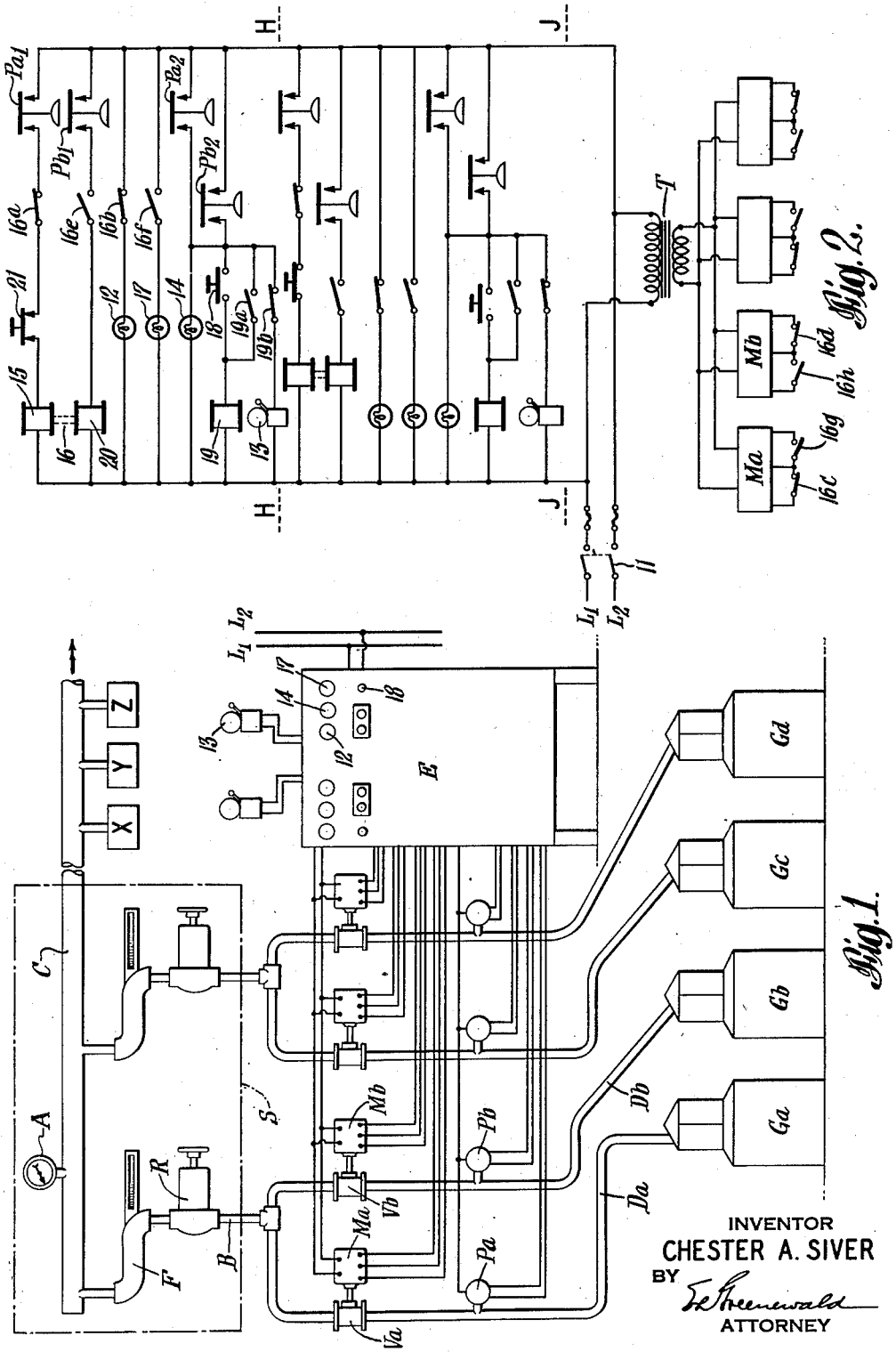

INVENTOR
CHESTER A. SIVER
BY
ATTORNEY

Patented June 18, 1946

2,402,187

UNITED STATES PATENT OFFICE 2,402,187

FLUID SUPPLY APPARATUS AND CONTROL SYSTEM THEREFOR

Chester A. Siver, United States Navy, assignor to Union Carbide and Carbon Corporation, a corporation of New York Application December 31, 1940, Serial No. 372,454

13 Claims. (Cl. 48—190)

The present invention relates to apparatus, and automatic control systems therefor, for automatically continuously supplying fluid to fluid utilizing means. More particularly, the invention relates to an automatic control system particularly applicable to two medium pressure acetylene generator units adapted to operate alternately to supply gas continuously at substantially constant pressure, between 1 and 15 pounds per square inch, to a load comprising gas-utilizing apparatus such, for example, as a battery of welding or cutting blowpipes. Moreover, the invention relates to such gas-generating apparatus, and control systems therefor, whereby large volumes of gas may be supplied to gas-utilizing means simply by connecting together in parallel several groups of two alternately operative gas-generator units, including their several independent control systems, to supply the common load.

Heretofore, the continuous supply of gas to gas-utilizing means from two acetylene generators operating alternately has been obtained in several different ways, each of which has certain undesirable features not present in the apparatus and control systems of the present invention. For example, one way of automatically obtaining alternate operation of two generators is to permit a first generator to operate continuously to supply the gas to a load at a predetermined pressure, and at the same time to permit a second standby generator to "float" on the line by setting its line pressure regulator at a lower pressure. When the calcium carbide charge in the operative first generator becomes exhausted, the gas pressure drops and the second generator automatically cuts into operation to supply the load at the lower pressure. Thereafter, an operator can step up the gas pressure by manually adjusting the line pressure regulator of the second generator. After the first generator is recharged with calcium carbide, it may be allowed to float on the line with its line pressure regulator set at a lower pressure than the second generator, so as to take up the operation automatically when the calcium carbide charge in the second generator becomes exhausted. It is apparent that supplying gas continuously in this way requires the time and skill of an operator to adjust manually the pressure regulators of the two generators for proper operation. Such manual adjustment also is undesirable because an operator may improperly adjust the pressure regulators, or forget to change the adjustments. Moreover, when the calcium carbide charge in either generator becomes exhausted, an unavoidable pressure drop occurs because of the relatively lower pressure setting of the pressure regulator of the standby generator, and such pressure fluctuation is undesirable for the proper operation of many kinds of gas-utilizing devices.

Another way of automatically operating two generators for continuously supplying gas to a load depends upon the mechanical interconnection of numerous levers, chains, plungers, and similar devices, which are operated by a large gas holder associated with the generators. Such apparatus is complicated, occupies a large amount of valuable space, and is not adapted for the control of medium-pressure generators wherein the acetylene is generated at pressures between 1 and 15 pounds per square inch. More important still, a complete cycle of operation from the first generator to the second generator, and then back to the first generator again, cannot be obtained without some manual operation, such as the movement of valves or the adjustment of counterweights, levers, and the like. If, therefore, an operator charges an exhausted generator with a fresh supply of calcium carbide, but inadvertently forgets to make the necessary manual adjustments, continuous operation in a complete cycle will not be obtained.

The principal object of the present invention is to provide apparatus and automatic control systems therefor whereby fluid at constant pressure may be supplied continuously to fluid-utilizing means without embodying the undesirable features of the prior art. Other objects are to provide automatic control systems for two alternately operative gas generators whereby a complete cycle of operation may be automatically obtained; to provide such control systems which shall be applicable to the control of medium pressure acetylene generators; to provide such control systems which shall be electrically operated; to provide such control systems having suitable indicating means operable automatically to indicate the condition of the several gas generators; and to provide such control systems which shall be simple and dependable in operation, and shall not require the expenditure of much time or money for maintenance. Still another object is to provide for the automatic control of, and the equalization of the rates of gas flow from, two or more groups of gas generators, each group comprising two alternately operative generators.

The above and other objects, and the novel features of the invention, will become apparent from the following description having reference to the accompanying drawings, in which:

Fig. 1 is a schematic view showing the relation between the gas-generating apparatus, the gas-utilizing apparatus, and one form of the automatic control system of the invention;

Fig. 2 is a diagram of the electrical circuit of the form of the automatic control system shown in Fig. 1;

Fig. 3 is a schematic view showing the relation between the gas-generating apparatus, the gas-utilizing apparatus, and another form of the automatic control system of the invention.

Figures 4, 5:
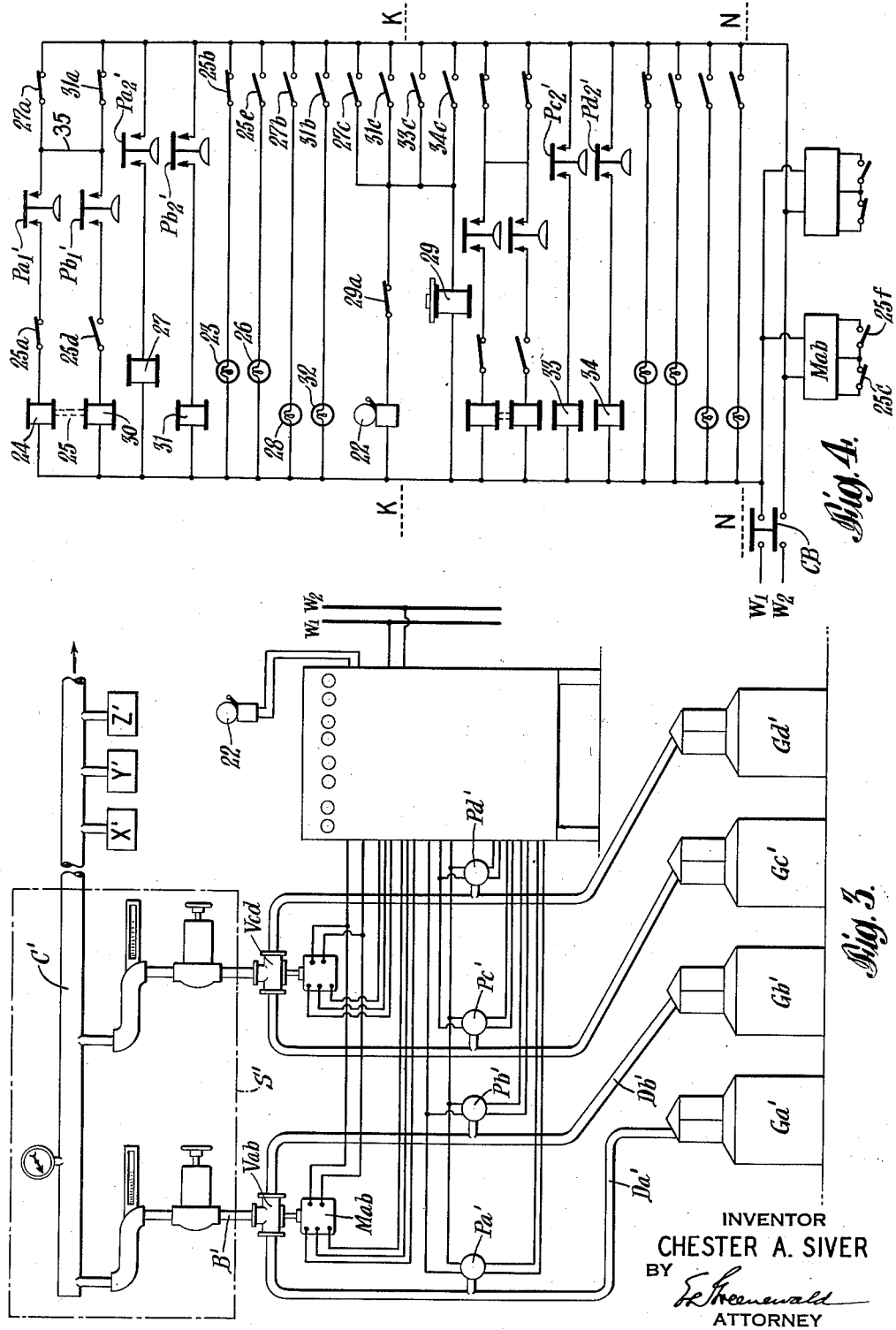
Fig. 4 is a diagram of the electrical circuit of the automatic control system of the embodiment of the invention shown in Fig. 3.

By way of example only, the automatic control systems of the present invention will be described as applied to the control of medium pressure acetylene gas generators of the type described and claimed in Patent No. 2,106,972 issued February 1, 1938, to M. P. De Motte. In such an acetylene generator, the acetylene gas is generated at pressures between 1 and 15 pounds per square inch by the well-known reaction of calcium carbide with water, the reaction rate being controlled automatically in accordance with the pressure of the gas within the generator; and, as a corollary function, the rate of gas generation being controlled in accordance with the rate of gas discharge from the generator. Such automatic control of gas generation is obtained by regulating the rate of feed of the calcium carbide into the water in a reservoir by a pressure-responsive diaphragm arranged for actuation by the generated gas, and suitable interconnecting linkages connecting the diaphragm to a calcium carbide feed control valve. It is to be understood, however, that any suitable acetylene generator embodying any suitable reaction-rate regulating mechanism may be employed. Moreover, the novel features of the invention not only are applicable to the automatic control of apparatus for supplying gases, but also to apparatus for supplying liquids or vapors.

The control system of the invention, generally, is applicable to two acetylene generator units adapted to operate alternately; or to any multiple of two units arranged in independent groups of two units each, for discharge of gas to a single delivery conduit. Each unit, of course, may under some circumstances consist of more than one generator. Fig. 1 shows the schematic arrangement of two independent groups of four acetylene generators Ga—Gb, and Gc—Gd with relation to the automatic control system of the invention, and to a load X, Y, Z which may represent any gas-utilizing apparatus having a fairly constant demand for gas, for example, a number of oxyacetylene cutting or welding blowpipes. Inasmuch as the two groups of generators are independently automatically controlled with identical control systems, the principles of the invention will be described for brevity as applied to the group consisting of acetylene generator units Ga and Gb, which are adapted to operate alternately to discharge gas to the load X, Y, Z.

Separate ducts Da and Db lead from the generator units Ga and Gb, respectively, to a single conduit or duct B which passes through a synchronization or equalization unit S and opens into a single delivery conduit C for conducting gas to the load represented by X, Y, Z. The synchronization unit S, which is fully described and claimed in my copending application Serial No. 331,678 filed April 26, 1940, for "Gas supply apparatus and control systems therefor," includes an extremely accurate pressure regulator R, having constant operating characteristics, and an accurate flowmeter F, which may be of the type sold under the trademark "Rotameter," connected in series into the single duct B. The regulator R is adjusted to give the desired pressure, as indicated by a pressure gauge A in the delivery conduit C, and the pressure thereafter remains constant regardless of variations in the rate of gas flow to the load X, Y, Z, as indicated by the flowmeter F. The principal function of the synchronization unit S, however, is to equalize the rates of gas flow from concurrently operating generators, such as Ga and Gc, when two or more groups of generators are arranged in parallel to supply a load. When such is the arrangement, the pressure regulator in the single duct of each group is so adjusted that the rate of gas flow from the operative unit of that group, such as Ga, is exactly equal to the rate of flow from each other operative unit, such as Gc, at the desired delivery conduit pressure indicated by the pressure gauge A. Thereafter, the rates of gas flow from each operative unit remain equal for any total rate of gas flow in the delivery conduit C, so that the load is equally distributed among the several concurrently operative generator units, and the several calcium carbide charges are expended at substantially equal rates.

Control valves Va and Vb, which may be operated by electric motors or solenoids Ma and Mb, respectively, are arranged in the respective discharge ducts Da and Db for controlling the discharge of gas from the generators, the valves being so arranged, and being so interlocked in a manner to be described below, that when either valve is in open position the other valve is in closed position. Fluid condition responsive means, such as the pressure switches Pa and Pb in the ducts Da and Db, also are associated with the generator units Ga and Gb and are adapted to be actuated automatically away from normal position at equal predetermined minimum pressures of the gas in the respective units. When the pressure of the gas in whichever unit is operative drops from normal to the predetermined minimum value, actuation of the pressure switch Pa or Pb associated therewith operates, through the electrical circuit represented by the panel board E, to reverse the positions of the interlocked control valves Va and Vb, thereby rendering the standby unit operative and the other unit inoperative. Upon recharging the inoperative unit with calcium carbide, the pressure of the gas therein again is brought up to normal, and the pressure switch associated therewith is actuated to normal position, the generator thereafter being ready to go into operation as soon as the calcium carbide charge in the operating generator becomes exhausted.

The generators respond instantly to operation of the control system, because the gas in the non-operating standby generator unit is always maintained at the normal operating pressure, equal to the pressure in the operating unit, by the automatic pressure-responsive carbide feed control mechanism previously described. As a result, when the valves Va and Vb are actuated to shift the load from one generator unit to the other, acetylene gas flows immediately from the newly operative generator at the proper pressure, without interrupting the flow of gas even momentarily.

The electrical circuit of the automatic control system, shown schematically in Fig. 1, is shown in detail in Fig. 2 as constructed for the automatic control of four acetylene generators, or other fluid supply devices, arranged in two independent groups of two generators each. The electrcal circuit, however, is divisible into two independent and identical control circuits, one circuit for controlling units $Ga$ and $Gb$ being above the horizontal dash line H—H, and the other circuit, for units $Gc$ and $Gd$, being between the horizontal dash lines H—H and J—J. For this reason, therefore, only that portion of the electrical circuit of the automatic control system above the dash line H—H will be described in detail.

For convenience of description, the positions of all the relay contacts as shown in Fig. 2 will be considered as their "normal" positions. Assuming that each of the two acetylene generators $Ga$ and $Gb$ is charged with an adequate supply of calcium carbide and water, and that the gas in each generator is at such a pressure that the contacts of the pressure switches $Pa$ and $Pb$ are open; and also assuming that the valve $Vb$ is in closed position and the valve $Va$ is in open position, generator unit $Ga$ thus being on stream and operative to supply gas to the load X, Y, Z, the first step in putting the automatic control system into operation is to close the main switch 11 connecting the electrical circuit to the two electrical conductors $L_1$ and $L_2$.

When the main switch 11 is closed, the amber light 12 is illuminated to indicate that generator unit $Ga$ is operating, and no change is made in the condition of the circuit. After unit $Ga$ has operated for some time, however, its charge of calcium carbide becomes exhausted and the pressure falls below a predetermined minimum value. Pressure switch $Pa$ then is actuated and closes its two contacts $Pa_1$ and $Pa_2$. Upon closing of the contact $Pa_2$, the alarm 13 sounds, and the red light 14 is illuminated to indicate that the generator $Ga$ is inoperable and requires recharging with calcium carbide. Closing of the contact $Pa_1$ energizes one coil 15 of a two coil relay 16, of the mechanically held type, which opens the normally-closed switch contacts 16a, 16b, 16c, and 16d, and closes the normally-open switch contacts 16e, 16f, 16g, and 16h.

Opening the contacts 16c and 16d, and closing the contacts 16g and 16h, associated with the motors $Ma$ and $Mb$ of the valves $Va$ and $Vb$, which are thus electrically interlocked by the relay 16, operates the motors $Ma$ and $Mb$ by the electrical current obtained from the conductors $L_1$—$L_2$ through a transformer T, and reverses the positions of the valves $Va$ and $Vb$. Generator unit $Gb$ then is rendered on stream and operative to discharge acetylene gas to the load X, Y, Z through the open valve $Vb$ in the duct $Db$, and generator unit $Ga$ is cut off.

Opening the contacts 16a and 16b, respectively, deenergizes the coil 15 of the relay 16, which then is mechanically held in position, and extinguishes the amber light 12, indicating that generator $Ga$ is inoperative. Closing the contact 16f illuminates a blue light 17 and indicates that generator $Gb$ is now operating.

As long as the pressure switch $Pa$ is closed, the alarm 13 will continue to sound unless the push button switch 18 is manually closed momentarily. When the switch 18 is closed, the relay 19 is energized, thereby closing the contact 19a, which provides a shunt around the push button switch 18 to maintain energization of the relay 19, and opening the contact 19b, which shuts off the alarm 13.

When the generator unit $Ga$ is recharged with calcium carbide and made operable again, the gas pressure rises above the predetermined minimum value to a normal pressure and actuates the pressure switch $Pa$, thus opening the contacts $Pa_1$ and $Pa_2$, the latter of which extinguishes the red light 14 and deenergizes the relay 19. Deenergizing the relay 19 opens the shunt contact 19a and closes the alarm contact 19b. It is evident that the control system thus is automatically placed in condition for completion of a cycle of operation back to generator unit $Ga$ when unit $Gb$ becomes inoperable.

When generator unit $Gb$ becomes inoperable because the calcium carbide charge is exhausted, or for any other reason, the pressure switch $Pb$ is actuated to close the contacts $Pb_1$ and $Pb_2$. Closing of the contact $Pb_2$ illuminates the red light 14 and sounds the alarm 13, which may be shut off by depressing the push-button switch 18. Closing of the contact $Pb_1$ energizes the other coil 20 of the mechanically held relay 16 through the closed switch contact 16e, and actuates all of the switch contacts associated therewith back to their normal positions, thereby extinguishing the blue light 17, illuminating the amber light 12, and causing the electrically interlocked valve motors $Ma$ and $Mb$ to return the valves $Va$ and $Vb$ to their original positions whereby the duct $Da$ was open and the duct $Db$ was closed. The generator unit $Ga$ then resumes operation if the gas pressure is normal therein. From the foregoing description it is evident that the relay 16 and associated contacts act as an interconnected control means for the valves $Va$ and $Vb$ so constructed and arranged that when either generator unit is on-stream the other is cut off.

If both generator units happen to be inoperable at the same time, and both pressure switches $Pa$ and $Pb$ therefore are closed, it is necessary to open manually the push-button switch 21 to prevent recycling of the relay 16. Otherwise, the circuits through the relay coils 15 and 20 will be alternately made and broken in continuous cycles as the switch contacts 16a and 16e are alternately closed and opened.

In the modified form of the invention shown schematically in Fig. 3, the principal apparent difference over the form of the invention shown in Fig. 1 lies in the use of single automatic three-way valves $Vab$ and $Vcd$ between the separate ducts leading from the generators and the single ducts leading to the delivery conduit C' through the synchronization unit S', instead of separate automatic electrically interlocked valves being provided, one in each of the separate ducts. This construction reduces the cost of construction to some extent and improves the reliability of operation because the means for controlling the passage of gas through the separate ducts, such as $Da'$ and $Db'$, to the single ducts, such as B', are mechanically interlocked by the integral construction of the three-way valve.

Other differences are apparent in the electrical circuit of the automatic control system, as shown in Fig. 4. For simplicity, only that portion of the electrical circuit above the horizontal dash line K—K, which controls the group of generators $Ga'$—$Gb'$, will be described in detail, because that portion of the electrical circuit between the horizontal lines K—K and N—N controlling the group of generators $Gc'$—$Gd'$ is substantially identical therewith; and because the two portions of the electrical circuit are independent of one another except insofar as each circuit is connected to the single alarm 22 common to both groups of generators. For convenience of description, the positions of the switch contacts shown in Fig. 4 will be considered "normal." Assuming that generator units $Ga'$ and $Gb'$ both are charged with calcium carbide and water, that the pressure switches $Pa'$ and $Pb'$ in the ducts $Da'$ and $Db'$ are in normal open position, and that the three-way valve $Vab$ is in such a position that gas will flow from the generator $Ga'$ through the duct $Da'$ to the single duct $B'$, the electrical circuit is placed in condition for operation of the automatic control system by manually closing the circuit breaker CB which connects the control circuit across the electrical conductors $W_1$ and $W_2$. Green light 23 then is illuminated to indicate that generator unit $Ga'$ is operating.

When the charge of calcium carbide in unit $Ga'$ becomes exhausted and the unit becomes inoperable as a result, the pressure switch $Pa'$ is actuated when the gas pressure falls below a predetermined minimum value, and its normally-open contacts $Pa_1'$ and $Pa_2'$ close.

Closing the contact $Pa_1'$ energizes the coil 24 of a two coil mechanically held relay 25, which opens the normally-closed contacts 25a, 25b, and 25c, and closes the normally-open contacts 25d, 25e, and 25f. Opening the contact 25c and closing the contact 25f operates the motor $Mab$ to reverse the position of the three-way valve $Vab$ to such a position that gas will flow from the new on-stream generator $Gb'$ through the duct $Db'$ to the single duct $B'$, and the duct $Da'$ will be closed cutting off generator $Ga'$. Opening the contact 25b extinguishes the green light 23; and closing the contact 25e illuminates the green light 26 to indicate that generator unit $Gb'$ is now operative.

Closing the contact $Pa_2'$ energizes a relay 27, which lags slightly behind the relay 25 in its action, to open the contact 27a, and close the contacts 27b and 27c. The contact 27a is opened for a purpose to be explained hereinafter. The contacts 27b and 27c are closed to complete the circuit through a red light 28 and the alarm 22, respectively, which indicate that the generator unit $Ga'$ is inoperable. Closing of the contact 27c also energizes a retarded relay 29, which operates automatically after a time delay period to open the contact 29a and shut off the alarm 22.

After the generator unit $Ga'$ is recharged with calcium carbide and the gas pressure therein builds up to a normal valve, the contacts $Pa_1'$ and $Pa_2'$ of the pressure switch $Pa'$ are actuated to open position, the relay 27 is deenergized, and the switches 27a, 27b, and 27c return to their normal positions, thus automatically placing the control system in condition for completion of the cycle of operation back to the generator unit $Ga'$ when unit $Gb'$ becomes inoperable.

When generator unit $Gb'$ becomes inoperable because of exhaustion of its charge of calcium carbide, or for any other reason, the contacts $Pb_1'$ and $Pb_2'$ of the pressure switch $Pb'$ are actuated to closed position.

Closing of the contact $Pb_1'$ energizes the coil 30 of the mechanically held relay 25 through the closed contact 25d, which restores the contacts 25a, 25b, 25c, 25d, 25e, and 25f to their normal positions as shown on the circuit diagram of Fig. 4. Actuation of the contacts 25c and 25f back to normal position again operates the motor $Mab$ to reverse the three-way valve $Vab$ and permit the passage of gas from the generator unit $Ga'$ through the duct $Da'$ to the single duct $B'$, and thence to the load $X'$, $Y'$, $Z'$ through the delivery conduit $C'$. The closing of the contact 25b illuminates the green light 23 to indicate that the unit $Ga'$ is operating; and the opening of the contact 25e extinguishes the green light 26.

Closing of the pressure switch contact $Pb_2'$ energizes the relay 31, which opens the contact 31a and closes the contacts 31b and 31c. The contact 31a, like the contact 27a, is opened for a purpose to be explained hereinafter. The closed contacts 31b and 31c illuminate the red light 32 and sound the alarm 22, respectively, to indicate that the generator unit $Gb'$ is inoperable. Closing of the contact 31c also energizes the retarded relay 29, which opens the contact 29a after a time delay period and shuts off the alarm 22.

After the generator unit $Gb'$ is made operable by recharging with calcium carbide, the gas pressure builds up to normal, the contacts $Pb_1'$ and $Pb_2'$ of the pressure switch $Pb'$ open, the relay 31 is deenergized and the switches 31a, 31b, and 31c return to their normal positions, thus placing the automatic control system in condition for a repetition of a half-cycle of operation back to unit $Gb'$ when unit $Ga'$ becomes inoperable.

The contacts 27a and 31a, which are located on the side of the contacts $Pa_1'$ and $Pb_1'$ remote from the relay 25, are provided to prevent automatically the continuous recycling of the relay 25 if both units $Ga'$ and $Gb'$ should be inoperative concurrently. In such a situation, both pressure switches $Pa'$ and $Pb'$ would be closed concurrently, with the result that the coils 24 and 30 of the relay 25 would be energized alternately in continuous cycles as the positions of the contacts 25a and 25d alternately changed, unless prevented in some way. This recycling is prevented, however, by automatically energizing the relays 27 and 31 through the pressure switch contacts $Pa_2'$ and $Pb_2'$ when both generators are inoperable, thereby opening the contacts 27a and 31a, which maintain open circuits to the coils 24 and 30 of the mechanically held relay 25. A by-pass electric conductor 35 connects together the portion of the two circuits of the relay 25 between the respective pressure switch contacts $Pa_1'$ and $Pb_1'$ and the contacts 27a and 31a. Thus, when either of the contacts 27a and 31a is closed and the other is open, a path for current to one or the other of the coils 24 and 30 is always provided.

The single alarm 22 also is operable to indicate the conditions of the units $Gc'$ and $Gd'$ when these units become inoperable. Pressure switches $Pc'$ and $Pd'$ are actuated when the respective units $Gc'$ and $Gd'$ become inoperable, with resultant closing of the respective contacts $Pc_2'$ and $Pd_2'$ in the electrical circuit between the horizontal dash lines K—K and N—N of Fig. 4. Closing of the contacts $Pc_2'$ or $Pd_2'$ energizes the respective relays 33 or 34 which close the alarm control switches 33c or 34c, respectively, and energize the retarded relay 29, which opens the switch 29a after a time delay period.

The broad principles of the invention have been described, by way of example only, as applied to a particular class of fluid supply devices and control systems therefor. It is evident, however, that changes in the construction and methods of operation may be made without departing from the spirit of the invention. For example, although pressure switches have been described as part of the control systems, other devices responsive to other fluid conditions, such as weight or rate of fluid flow, may be employed under certain conditions. Likewise, the automatic control valves could be operated by solenoids, air motors, and the like. The scope of the invention, therefore, is to be defined by the claims appended hereto, and is not to be limited to the particular embodiments of the invention described.

What is claimed is:

1. In combination, two gas supply units; a conduit connected to each unit to carry gas therefrom to a point of use; valve means in each conduit; interconnected control means for said valve means so arranged that one conduit is open only when the other is closed so that when one unit is on stream the other is off stream; an individual gas pressure responsive device associated with each unit and subject to the pressure therein, said devices being arranged to operate at predetermined minimum gas pressures in said units; means connecting said devices with the valve control means so that upon existence of said predetermined minimum gas pressure in the then on stream unit the latter will be put off stream and the then off stream unit will be put on stream.

2. In combination, first and second gas supply units constructed and arranged to discharge gas to a load alternately; conduits leading from said units and adapted to carry gas to such load; valve means controlling the flow of gas from said units through said conduits to said load; electrical actuating means for said valve means; and a control system including a two-coil relay having contacts in circuit with said actuating means for controlling said valve means, the construction and arrangement of said valve means, said valve actuating means and said relay being such that when either unit is on stream, the other unit is cut off, said control system also including individual gas pressure responsive switch devices severally operatively associated with said units and having contacts severally in circuit with said two relay coils, one of said pressure responsive devices being so constructed and arranged as to operate at a predetermined minimum gas pressure in said first unit to energize one of said coils and thereby actuate said valve means in response to a predetermined minimum gas pressure in said first unit so that an alternation of the unit on stream is effected, thereby completing a half cycle from said first unit to said second unit, the other of said pressure responsive devices being so constructed and arranged as to operate at a predetermined minimum gas pressure in said second unit to energize the other of said coils and thereby actuate said valve means in response to a predetermined minimum gas pressure in said second unit, thereby completing the cycle back to said first unit.

3. The combination as claimed in claim 2, wherein said control system also includes switch means in circuit with at least one of said relay coils constructed and arranged to be opened to prevent continuous cyclic action of said relay when the gas pressure in both units is below such predetermined minimum value.

4. The combination as claimed in claim 2, wherein said control system also includes relay means controlled by at least one of said pressure responsive switch devices, said relay means including switch means in circuit with at least one of said relay coils, said relay means being so constructed and arranged as to open said switch means when said pressure responsive switch device is actuated at such predetermined minimum pressure in the unit associated therewith, whereby continuous cyclic action of said two-coil relay is prevented when the gas pressure in both units is below such predetermined minimum value.

5. The combination as claimed in claim 2 wherein said control system also includes two other relays controlled one by each of said pressure responsive switch devices, each of said other relays having a contact in circuit with a different coil of said two-coil relay, said other relays being so constructed and arranged as to open the contacts thereof in response to such predetermined minimum gas pressure in said units, whereby continuous cyclic action of said two-coil relay is prevented when the gas pressure in both units is below such predetermined minimum; and wherein an electric conductor connects together the portions of the two circuits of said two-coil relay located between the respective pressure switch contacts and the respective contacts of said two other relays.

6. The combination with two gas supply units constructed and arranged to discharge gas to a load alternately, a single conduit, separate ducts leading from said units to said conduit, and separate valves in said ducts: of a control system including electrical operating mechanism for said valves; a valve-interlocking relay controlling said mechanism, the construction and arrangement of said mechanism and said relay being such that when either valve is open and the corresponding unit is on stream, the other valve is closed and the corresponding unit is cut off; individual gas pressure responsive switch devices severally operatively associated with said units and controlling said relay, said devices being so constructed and arranged as to operate at predetermined minimum gas pressures in said units to actuate said valves in response to a predetermined minimum gas pressure in any on-stream unit so that an alternation of the unit on stream is effected, thereby completing a half cycle to transfer the load from a first unit to a second unit, said pressure responsive switch devices and said relay also being so constructed and arranged as to complete the cycle back to said first unit by again actuating said valves in response to a predetermined minimum gas pressure in said second unit.

7. The combination with two gas supply units constructed and arranged to discharge gas to a load alternately, a single conduit, separate ducts leading from said units to said conduit, and a single valve controlling the flow of gas from both of said ducts into said conduit, said valve being so constructed and arranged that when either of said units is on stream the other unit is cut off: of a control system including electrical operating mechanism for said valve; a relay controlling said mechanism; individual gas pressure responsive switch devices severally operatively associated with said units and controlling said relay, said devices being so constructed and arranged as to operate at predetermined minimum gas pressures in said units to actuate said valve in response to a predetermined minimum gas pressure in any on-stream unit so that an alternation of the unit on stream is effected, thereby completing a half cycle to transfer the load from a first unit to a second unit, said pressure responsive switch devices and said relay also being so constructed and arranged as to complete the cycle back to said first unit by again actuating said valve in response to a predetermined minimum gas pressure in said second unit.

8. In combination, two gas generators; means controlling the rate of gas generation in each generator in accordance with the rate of gas discharge therefrom; a conduit connected to each generator to carry gas therefrom to a point of use; valve means in each conduit; interconnected control means for said valve means so arranged that one conduit is open only when the other is closed so that when one generator is on stream the other is off stream; an individual gas pressure responsive device associated with each unit and subject to the pressure therein, said devices being arranged to operate at predetermined minimum gas pressures in said generators; means connecting said devices with the valve control means so that upon existence of said predetermined minimum gas pressure in the then on stream generator the latter will be put off stream and the then off stream generator will be put on stream.

9. In combination, two gas supply units; a conduit connected to each unit to carry gas therefrom to a point of use; valve means in each conduit; interconnected control means for said valve means so arranged that one conduit is open only when the other is closed so that when one unit is on stream the other is off stream; an individual gas pressure responsive device associated with each unit and subject to the pressure therein, said device being arranged to operate at predetermined minimum gas pressures in said units; means connecting said devices with the valve control means so that upon existence of said predetermined minimum gas pressure in the then on stream unit the latter will be put off stream and the then off stream unit will be put on stream; signal means; and means connecting said signal means with said devices so that upon existence of said predetermined minimum gas pressure in either unit said signal means is operated to indicate the same.

10. In combination, two gas supply units constructed and arranged to discharge gas to a load alternately, a single conduit, separate ducts connecting said units to said single conduit, electrically operable valve means controlling the flow of gas from said ducts into said single conduit, interconnected control means for said valve means so constructed and arranged that when either unit is on stream, the other unit is cut off, individual gas pressure responsive switch devices severally connected into said ducts between said units and said valve means and cooperating with said control means, said devices being so constructed and arranged as to operate at predetermined minimum gas pressures in said units to actuate said valve means in response to a predetermined minimum pressure in the on-stream unit so that an alternation of the unit on stream is effected, and electrical signal means in circuit with said switch devices constructed and arranged for automatically indicating whether or not the gas pressure in either unit is above such predetermined minimum.

11. In combination, a plurality of gas supply units arranged in at least two independent groups; an indicating device common to said groups; pressure responsive devices severally associated with said units and operable at predetermined minimum gas pressures therein; and individual electrical control systems severally controlling said groups of units, including relays operable by said pressure responsive devices, all of said relays being so constructed and arranged as to actuate said indicating device in response to a predetermined minimum pressure of the gas in any of said units.

12. In combination, a single gas delivery conduit; at least two groups of gas supply units, each of said groups comprising two units and discharge conduits connected to each of said two units and to said delivery conduit; individual control systems severally controlling said groups, each control system comprising valve means in each discharge conduit of the same group, interconnected control means for said valve means so arranged that one conduit of a group is open only when the other conduit of the same group is closed so that when one unit of said group is on stream the other is off stream, an individual gas pressure responsive device associated with each unit and subject to the pressure therein, said devices being arranged to operate at predetermined minimum gas pressures in said units, means connecting said devices with the valve control means so that upon existence of said predetermined minimum gas pressure in the then on stream unit the latter will be put off stream and the then off stream unit will be put on stream; and means equalizing the rates of gas discharge from concurrently operating units of said groups.

13. In combination, a single gas delivery conduit; at least two groups of gas generator units, each of said groups comprising two generator units and discharge conduits connected to each of said two units and to said delivery conduit; means controlling the rate of gas generation in each of said generator units in accordance with the rate of gas discharge therefrom; individual control systems severally controlling said groups, each control system comprising valve means in each discharge conduit of the same group, interconnected control means for said valve means so arranged that one conduit of a group is open only when the other conduit of the same group is closed so that when one unit is on stream the other unit of the same group is off stream, an individual gas pressure responsive device associated with each unit and subject to the pressure therein, said devices being arranged to operate at predetermined minimum gas pressures in said units, means connecting said devices with the valve control means so that upon existence of said predetermined minimum gas pressure in the then on stream unit the latter will be put off stream and the then off stream unit will be put on stream; and means equalizing the rates of gas discharge from concurrently operating units of said groups.

CHESTER A. SIVER.